W. G. COX.
ATTACHING DEVICE FOR AUTOMOBILE BUFFERS.
APPLICATION FILED SEPT. 21, 1920. RENEWED OCT. 17, 1921.
1,398,089.
Patented Nov. 22, 1921.
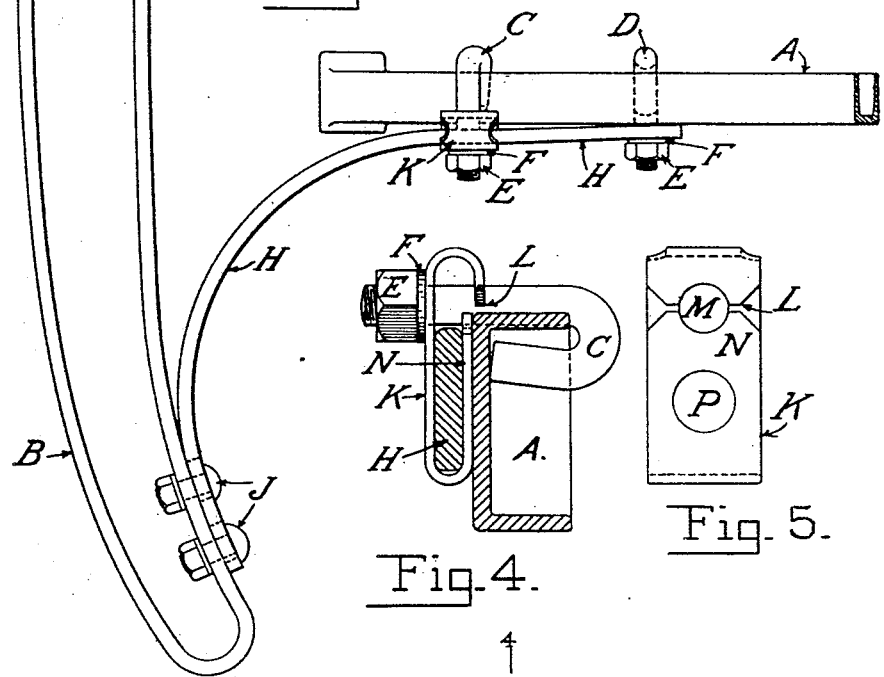
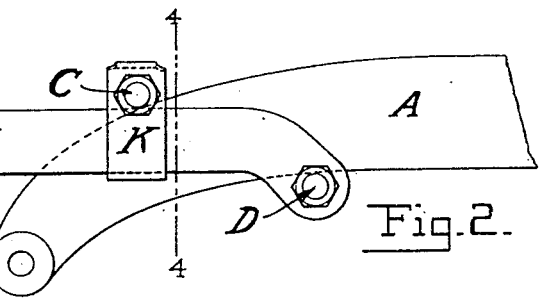
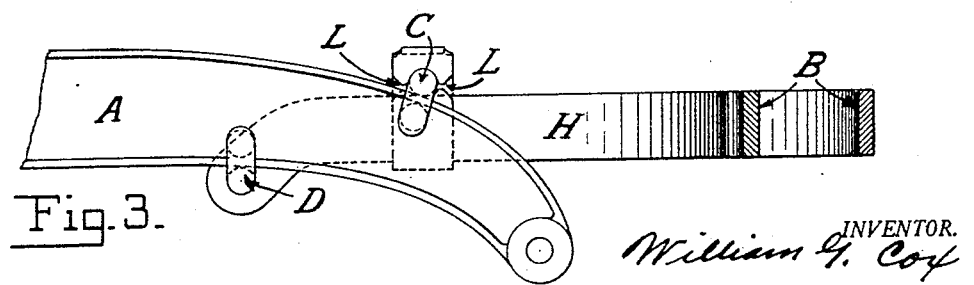

UNITED STATES PATENT OFFICE.

WILLIAM G. COX, OF CLEVELAND, OHIO, ASSIGNOR TO COX MANUFACTURING COMPANY, OF ALBANY, NEW YORK.

ATTACHING DEVICE FOR AUTOMOBILE-BUFFERS.

1,398,089.  Specification of Letters Patent.  Patented Nov. 22, 1921.

Application filed September 21, 1920, Serial No. 411,797. Renewed October 17, 1921. Serial No. 508,394.

*To all whom it may concern:*

Be it known that I, WILLIAM G. COX, a citizen of the United States of America, residing at Cleveland, in the county of Cuyahoga and State of Ohio, have invented certain new and useful Improvements in Attaching Devices for Automobile-Buffers, of which the following is a specification.

My invention relates to attaching devices for automobile buffers, the object of my present invention being to produce a device by means of which the buffer may be securely and adjustably attached to the channeled side bar of an automobile frame without having the supporting member of the buffer weakened by having an attaching hole or holes, drilled therein intermediate the ends thereof. Together with such other objects and combinations as may be hereafter disclosed.

The manner in which I accomplish my objects is illustrated by the accompanying drawings in which:

Figure 1. is a plan view of a portion of an automobile frame having a portion of a buffer attached thereto by means of my device.

Fig. 2. is a side elevation of the same.

Fig. 3. is a side elevation the reverse of that shown in Fig. 2.

Fig. 4. is a cross-section along the line 4—4 on Fig. 2.

Fig. 5. is an elevation of my improved attaching clip.

The same reference characters refer to the same parts throughout the several views.

Referring to the drawings, A represents the channeled side bar of an automobile frame, B the impact receiving member of the buffer, and H the supporting member, the impact receiving member and the supporting member being of any suitable type and fastened together in any suitable manner, as by the bolts J.

I preferably bend downwardly the rear end of the supporting member H, as illustrated in Figs. 2 and 3 and fasten it to the lower rib of the channeled side bar A, by means of a hook bolt D, provided with a nut E, and lock washer F, as shown. It is, of course, obvious that the bend in the supporting member could be dispensed with by making the clip K relatively longer.

In order to form an adjustable support for the buffer, at a point intermediate the ends of the supporting member, I provide the attaching clip K, the shape of which, and the manner of applying, is clearly illustrated by Figs. 4 and 5.

Referring to these figures it will be noted that the clip is formed from a piece of "flat" stock the ends of which are bent back upon themselves; the lower end forming a loop of sufficient length and width to receive therein the supporting member H of the buffer, and the upper end being somewhat shorter and wider and having formed therethrough an opening M, through which the shank of the hook bolt C passes.

The attaching clip having been slid into place on the supporting member H, and the hook bolts C and D put in position, the attachment clip may then be positioned so as to give the desired elevation to the buffer, and when the nut on the hook bolt is tightened, the clip K, supporting member H, and channeled side bar A will be firmly clamped together.

The points L of the attachment clip are designed to project over and contact with the upper side of the side bar A, and to act as a stop to prevent the buffer from dropping while the clip is being positioned and the bolt C inserted, or should the hook bolt C accidentally become loosened or broken.

A hole P is provided in the portion N of the clip K; this hole provides clearance for the head of a rivet should one project from the face of the side bar at the point where the attachment is to be made.

What I claim as new and desire to secure by Letters Patent is:

1. In a device for attaching buffers to the frame of an automobile, a clip having a hook formed at each end thereof, one of said hooks adapted to receive and fit closely the supporting member of the buffer, the other having an opening through each side thereof adapted to receive the shank of a bolt.

2. In a device for attaching buffers to the frame of an automobile, a hook bolt with a nut, and an attachment clip having a hook formed at each end thereof, one of said hooks adapted to engage the supporting member of the buffer, the other having an opening therethrough adapted to engage the shank of said hook bolt.

3. In a device for attaching buffers to the frame of an automobile, a clip having a hook formed at each end thereof, one of said hooks adapted to engage the supporting member of the buffer, the other having an opening through each side thereof adapted to engage the shank of a bolt; and a pair of hook bolts, one adapted to fasten the rear end of the supporting member of the buffer to the side bar of an automobile frame, the other to bind together said clip, supporting member and side bar.

4. In a device for attaching buffers to the frame of an automobile, a pair of hook-bolts and nuts, one of said bolts adapted to pass through an opening formed through the rear end of the supporting member of the buffer and to engage one of the flanges on the side bar of said frame, the other adapted to pass through openings formed in an attachment clip and engage the other flange of said side bar; and an attachment clip having a hook formed at each end thereof, one of said hooks adapted to receive and closely engage the supporting member of the buffer, the other hook having an opening through both sides thereof adapted to engage the shank of one of said hook-bolts, this last mentioned hook of the clip wider than the other and extending over and beyond it, all substantially as shown and described and for the purposes set forth.

In testimony whereof I have affixed my signature.

WILLIAM G. COX.